United States Patent
Chen et al.

(10) Patent No.: US 10,498,175 B2
(45) Date of Patent: Dec. 3, 2019

(54) WIRELESS POWER RECEIVING METHOD AND MULTICOIL MULTIPLEX WIRELESS POWER RECEIVING DEVICE THEREOF

(71) Applicant: Youhua Technology (Shenzhen) Co., Ltd, Shenzhen (CN)

(72) Inventors: Shu-Mu Chen, Hsin Chuang (TW); Poh Chia Cheng, Johor (MY)

(73) Assignee: YOUHUA TECHNOLOGY (SHENZHEN) CO., LTD, Shenzhen (CN)

( * ) Notice: Subject to any disclaimer, the term of this patent is extended or adjusted under 35 U.S.C. 154(b) by 221 days.

(21) Appl. No.: 15/791,418

(22) Filed: Oct. 24, 2017

(65) Prior Publication Data
US 2018/0166927 A1    Jun. 14, 2018

(30) Foreign Application Priority Data
Dec. 8, 2016 (CN) .......................... 2016 1 1123332

(51) Int. Cl.
*H02J 50/40* (2016.01)
*H02J 50/10* (2016.01)
*H02J 50/80* (2016.01)
*H01F 38/14* (2006.01)
*H04B 5/00* (2006.01)

(52) U.S. Cl.
CPC .............. *H02J 50/40* (2016.02); *H01F 38/14* (2013.01); *H02J 50/10* (2016.02); *H02J 50/80* (2016.02); *H04B 5/0037* (2013.01)

(58) Field of Classification Search
None
See application file for complete search history.

(56) References Cited

U.S. PATENT DOCUMENTS

| | | | | |
|---|---|---|---|---|
| 2016/0099613 | A1* | 4/2016 | Bell | H02J 7/025 307/104 |
| 2016/0099614 | A1* | 4/2016 | Leabman | H01Q 1/243 307/104 |
| 2017/0141621 | A1* | 5/2017 | Zeine | H02J 50/20 |

\* cited by examiner

*Primary Examiner* — Jared Fureman
*Assistant Examiner* — Aqeel H Bukhari

(57) ABSTRACT

A wireless power receiving method and a multicoil multiplex wireless power receiving device using same is disclosed. The method includes: a receiving coil for receiving AC signals from a transmitting base station; a rectifying unit for rectifying and converting the AC signal into a DC signal; a multiplexing device for receiving the DC signal from the rectifying unit and thereafter outputting direct current; a communicating and controlling device for modulating the multiplexing device and the receiving coil to feedback the electrical signal to the base station, and monitoring the load outputted. The communicating and controlling device adjusts the feedbacks during the electrical signal of the load abnormal. In the present disclosure, the receiving coil can fix in any position, rather than the receiving coil aligning to a corresponding coil of the base station, which can obtain a normal transmission work between the wireless power receiving device and the base station.

19 Claims, 4 Drawing Sheets

WIRELESS POWER RECEIVING METHOD AND MULTICOIL MULTIPLEX WIRELESS POWER RECEIVING DEVICE THEREOF

BACKGROUND

1. Technical Field

The present disclosure generally relates to wireless powers field, and especially relates to a wireless power receiving method and a multicoil multiplex wireless power receiving device thereof.

2. Description of Related Art

Wireless power transmission refers to non-contact power transmission between a primary coil (transmitting coil) of a transmitting device and a secondary coil (receiving coil) of a receiving device by using the alternating magnetic fields, with power ranges from a few watts to thousands of watts. Thus, it can avoid the danger of "jumping fire" (or "arcing") of the devices due to the ageing of connection without requiring a physical connector to connect therebetween. In this way, this type of power transmission is greatly convenient to use.

At present, among all kinds of wireless power transmission devices, the coil of a receiving device needs to align to the coil of a transmitting base station to obtain the most efficient and safe power transmission. Under the existing technical conditions, the following four measures are to generally involved:

(1) Magnetic guidance: a powerful magnet is positioned on the center between the transmitting coil and the receiving coil to align the transmitting coil with the receiving coil by a magnetic suction, thus, the powerful limpets may damage storage data and the location devices located in a receiving end of a digital device.

(2) Power driven: the transmitting coil and the receiving coil aligned to each other is automatically driven by a stepping motor, in this way, the stepping motor and its servo circuit are too expensive to conducive to the popularization of products. In addition, because the transmitting coil follows the stepping motor to move so that the wire of the transmitting coil is too long, thereby resulting in excessive loss of alternating current and insufficient power transmission thereof.

(3) Multicoil transmission: a plurality of transmitting coils are arranged to form a coil matrix, in this way, a corresponding transmitting coil is activated to work by induction of the position of a receiving coil, thereby obtaining signal transmission between the transmitting coil and the receiving, coil without needing alignment thereof. Such method above mentioned not only may result in that the plurality of transmitting coils can't simultaneously work, but also a "dead zone" is formed between the plurality of transmitting coils during in actual usage, and it can't really form "alignment" between the transmitting coil and the receiving coil. In addition, it's needed to provide a plurality of driving circuits to drive the plurality f transmitting coils, which is expensive acid increase the production cost thereof.

(4) Marking-point alignment: a printed label is artificially aligned on the working surface of the transmitting base station when a receiving device is placed on the transmitting base station. Such method is not easy to align the receiving device with the transmitting base station during hi actual usage although the devices are cheap. In addition, the receiving device may be out of its "alignment" state under an external force during the working process, which results in the power transmission lost.

Therefore, it is needed to design a new wireless power receiving device which may normally receive the electrical energy from a transmitting base station as long as it is positioned on the working plane of the transmitting base station, neither needing to "alignment" by a traditional magnetic guidance, nor needing to drive the transmitting coil "alignment" by power.

SUMMARY

The disclosure relates to a wireless power receiving method and a multicoil multiplex wireless power receiving device using same, which may normally receive the electrical energy from a transmitting base station as long as it is positioned on the working plane of the transmitting base station, neither needing to "alignment" by a traditional magnetic guidance, nor needing to drive the transmitting coil "alignment" by power.

The object of the present disclosure is to achieve by the following technical proposal:

In one aspect, a wireless power receiving method includes:

a receiving coil configured for receiving AC signals from a transmitting base station;

a rectifying unit configured for rectifying and converting the AC signal into a DC signal;

a multiplexing device configured for receiving the DC signal from the rectifying unit and thereafter outputting direct current;

a communicating and controlling device configured for modulating the multiplexing device and the receiving coil to feedback the electrical signal to the transmitting base station, and monitoring an output end of a load; and wherein the communicating and controlling device adjusts the feedbacks when the electrical signal of the load is abnormal.

Wherein the receiving coil includes a main coil and a sub-coil, the main coil is configured for receiving a main wireless power and the sub-coil is configured for receiving a diffusion power of the marginal of the main coil.

Wherein the output end of e load includes a sensor configured for monitoring the voltage, the current and the temperature of the output end of the load.

Wherein the receiving coil is selected from a coil-winding coiled by wire or a printed-coil embedded in a PCB lamination.

Wherein the multicoil multiplex wireless power receiving device further includes a signal transmission line connected between the output end of the load and the communicating and controlling device, the signal transmission line is configured for transmitting the monitoring signal of the sensor to the communicating and controlling device.

In another aspect, a multicoil multiplex Wireless power receiving device according to an exemplary embodiment of the present disclosure includes:

a receiving and rectifying device including a plurality of coils and a plurality of rectifying units electrically connected to the plurality of coils, the plurality of coils configured for receiving AC signals from a transmitting base station; the plurality of rectifying units configured for receiving the AC signals from the plurality of coils and then rectifying and converting the AC signal into a DC signal;

a multiplexing device configured for receiving the DC signal processed by the rectifying unit and thereafter outputting direct current into an output end of a load, and further configured for supplying power to a communicating and controlling device; wherein the communicating and controlling device is communicated with the multiplexing device to process the signal from the multiplexing device and configured for sending a regulatory signal to the multiplexing device; and the output end of the load is configured for receiving the direct current processed by the multiplexing device and outputting the direct current to an external device for supplying power.

Wherein the multiplex wireless power receiving device further includes a communicating terminal connected between the receiving and rectifying device and the multiplexing device, the multiplexer device is configured for modulating the plurality of coils via the communicating terminal.

Wherein the plurality of coils can be arranged in accordance with the user's needs.

Wherein the plurality of coifs includes a main coil and a sub-coil, the main coil is configured for receiving a main wireless power and the sub-coil is configured for receiving a diffusion power of the marginal of the main coil.

Wherein the plurality of coils is selected from a coil-winding coded by wire or a printed-coil embedded in a PCB lamination.

Wherein the output end of the load includes a sensor configured for monitoring the voltage, the current and the temperature of the output end of the load.

Wherein the multicoil multiplex wireless power receiving device further includes a signal transmission line connected between the output end of the load and the communicating and controlling device, the signal transmission line is configured for transmitting the monitoring signal of the sensor to the communicating and controlling device.

In a third aspect, a multicoil multiplex wireless power receiving device for wireless power transmission from a transmitting base station includes:

a plurality of receiving and rectifying devices, a multiplexing device, a communicating and controlling device and an output end of a load, the plurality of receiving and rectifying devices configured for supplying power to the multiplexing device and communicating with the communicating an controlling device, the multiplexing device configured for supplying power to both the communicating an controlling device and the output of the load, and also communicating with the communicating and controlling device;

the plurality of receiving and rectifying devices including a plurality of coils and, a plurality of rectifying units electrically connected to the plurality of coils; the plurality of coils configured for receiving AC signals from the transmitting base station and the plurality of rectifying units configured for receiving the AC signals from the plurality of coils and then rectifying and converting the AC signal into a DC signal;

the multiplexing device configured for receiving the DC signal processed by the rectifying unit and thereafter outputting direct current into the output end of the load;

the communicating and controlling device configured for modulating the multiplexing device and the plurality of coils to feedback the electrical signal to the transmitting base station, and simultaneously monitoring the output end of the load; and wherein the communicating and controlling device adjusts the feedbacks when the electrical signal of the output end of the load is abnormal.

Wherein the multiplex wireless power receiving device further includes a communicating terminal connected between the receiving and rectifying device and the multiplexing device, the multiplexer device is configured for modulating the plurality of coils via the communicating terminal.

Wherein the plurality of coils can be arranged in accordance with the user's needs.

Wherein the plurality of coils includes a main coil and a sub-oil, the main coil is configured for receiving a main wireless power and the sub-coil is configured for receiving a diffusion power of the marginal of the main coil.

Wherein the plurality of coils is selected from a coil-winding coiled by wire or a printed-coil embedded in a PCB lamination.

Wherein the output end of the load includes a sensor configured for monitoring the voltage, the current and the temperature of the output end of the load.

Wherein the multicoil multiplex wireless power receiving device further includes a signal transmission line connected between the output end of the load and the communicating, and controlling device, the signal transmission line is configured for transmitting the monitoring signal of the sensor to the communicating and controlling device.

The present disclosure provides the advantages as below.

First, the multicoil multiplex wireless power receiving device of the present disclosure sets a multiplexing device configured for enabling the plurality of coils independently work or simultaneously work, therefore, during in actual usage, the receiving coils can be optionally folded according to the shape of products or user's requirement. The multicoil multiplex wireless power receiving device and the transmitting base station do not need to be deliberately "aligned" for the purpose of random placement.

Second, the multicoil multiplex wireless power receiving device of the present disclosure may normally receive the electrical energy from the transmitting base station as long as it is positioned on the working plane of the transmitting base station, neither needing "alignment" by a traditional magnetic guidance, nor needing to drive the transmitting coil "alignment" via power, which is simple and of high transmission efficiency.

DETAILED DESCRIPTION

Figure 1:
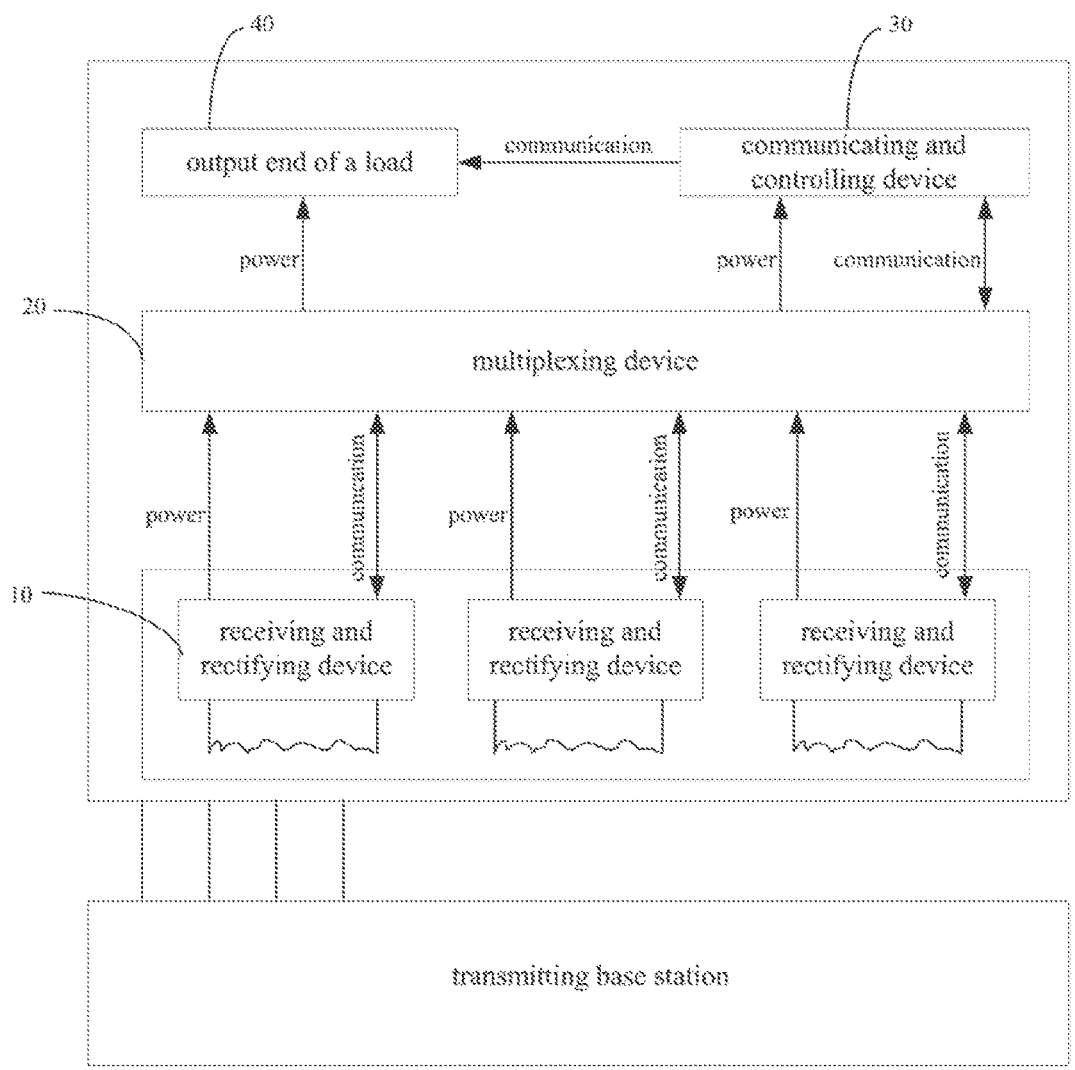
FIG. 1 is a working schematic view of the multicoil multiplex wireless power receiving device in accordance with an exemplary embodiment.

The disclosure is illustrated by way of example and not by way of limitation in the figures of the accompanying drawings, in which like reference numerals indicate similar elements.

Figure 2:
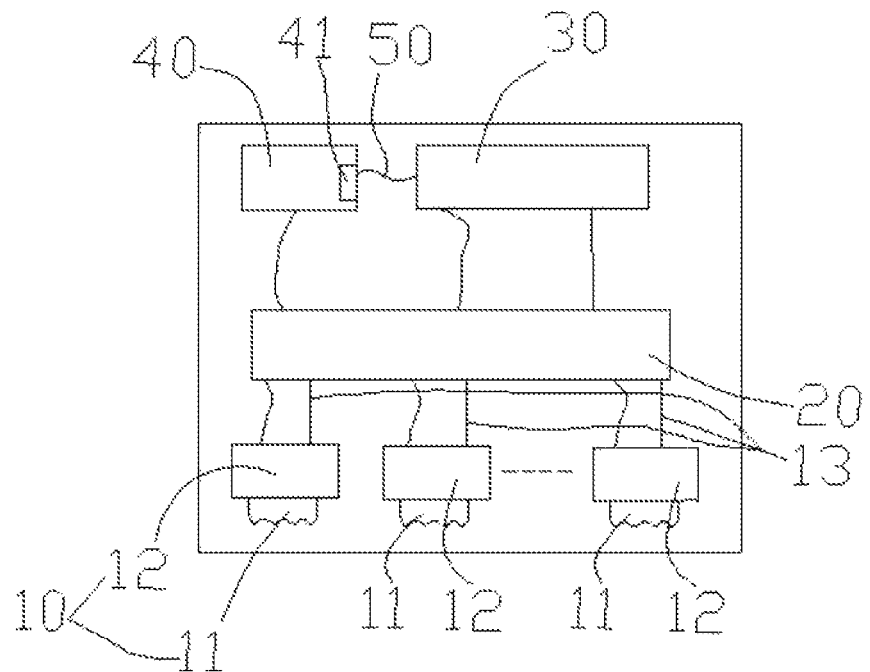
FIG. 2 is a schematic view of the multicoil multiplex wireless power receiving device of FIG. 1.

Referring to FIG. 1 and FIG. 2, the wireless power receiving method and the multicoil multiplex wireless power receiving device using same according to an exemplary embodiment are provided. The multicoil multiplex wireless power receiving device includes a receiving and rectifying device 10, a multiplexing device 20, a communicating and controlling device 30 and an output end of a load 40. The receiving and rectifying device 10 is configured for supplying power to the multiplexing device 20 and communicating with the communicating and controlling device 30. The multiplexing device 20 is configured for supplying power to both the communicating and controlling device 30 and the output end of the load 40, and also communicating with the communicating and controlling device 30. The receiving and rectifying device 10 includes a plurality of coils 11 and a plurality of rectifying units 12 electrically connected to the plurality of coils 11. The plurality of coils 11 is configured for receiving AC signals from the transmitting base station and the plurality of rectifying units 12 is configured for receiving the AC signals from the plurality of coils 11 and then rectifying and converting the AC signal into a DC signal. The multiplexing device 20 is configured for receiving the DC signal processed by the rectifying unit 12 and thereafter outputting direct current into the output end of the load 40 and supplying power to the communicating and controlling device 30. The communicating and controlling device 30 is communicated with the multiplexing device 20 to process the signal from the multiplexing device 20 and configured for sending a regulatory signal to the multiplexing device 20. The output end of the load 40 is configured for receiving the direct current processed by the multiplexing device 20 and outputting the direct current to an external device for supplying power.

Furthermore, the multicoil multiplex wireless power receiving device further includes a communicating terminal 13 connected between the receiving and rectifying device 10 and the multiplexing device 20 so that the multiplexer device 20 is configured for modulating the plurality of coils 11 via the communicating terminal 13.

Furthermore, the plurality of coils 11 can be arranged in accordance with the user's needs.

Specifically, referring to FIGS. 3-6, the plurality of coils 11 is receiving coils configured for inducting and receiving an electrical signal from the wireless power transmitting base station, wherein the electrical signal is an AC electrical signal. The plurality of coils 11 can be arranged according to the needs of a user's favorite shell-shape. The coil 11 is electrically connected to the rectifying unit 12 to form a rectifying loop, thereby the receiving and rectifying device 10 includes a plurality of rectifying loops. During receiving the electrical signals from the transmitting base station, among the plurality of coils 11, there is always a coil aligning with a transmitting coil of the transmitting base station, which receives the main electrical signal, while the rest of the plurality of coils 11 secondarily receives the electrical signal. The plurality of rectifying units 12 is configured for integrating the AC signal received from the transmitting base station by the plurality of coils into direct current and then outputting the direct current into the multiplexing device 20. The multiplexing device 20 is a multiplexer anti configured for outputting the direct current processed by the plurality of rectifying units 12. On the one hand, the multiplexing device 20 supplies power to the communicating and controlling device 30 to ensure the communicating and controlling device 30 normally work without all external power supply. On the other hand, the multiplexing device 20 also outputs the direct current to the output end of the load 40. The receiving and rectifying device 10 communicates with the multiplexing device 20 by the communicating terminal 13, while the multiplexing device 20 communicates with the communicating and controlling device 30. The receiving and rectifying device 10 passes the electrical signals to the multiplexing device 20 and finally reaches the communicating and controlling device 30, thereby the communicating and controlling device 30 transmits the modulation signals, and then the multiplexing device 20 receives the modulating signals to communicate and modulating the plurality of coils 11. Thus, the communicating and controlling device 30 realizes monitoring and modulating the whole receiving and conversion electrical signals. Furthermore, the communicating and controlling device 30 feedbacks the electrical signals to the wireless power transmitting base station so as to realize the power adjustment and abnormal data processing of the wireless power transmitting base station. The output end of the load 40 is a terminal of the multicoil multiplex wireless power receiving device and configured for receiving the direct current processed by the multiplexing device 20 and outputting the direct current to an external device for supplying power thereto.

In an exemplary embodiment of the present disclosure, the multicoil multiplex wireless power receiving device of the present disclosure includes the multiplexing device 20 for enabling the plurality of receiving coils 11 to simultaneously work and outputting the electrical energy received from the plurality of coils 11. In this way, Regardless of the coil of the transmitting base station is aligned with anyone side coil of the plurality of receiving coils 11, or aligned with anyone middle coil of the plurality of receiving coils 11, Winch can normally transmit wireless power therebetween. Neither needing the "alignment" by a traditional magnetic guidance, nor needing to drive the transmitting coil "alignment" by power, thus, the receiving coil 11 may optionally place without needing alignment and is simple structure thereof.

In an exemplary embodiment of the present disclosure, the multicoil multiplex wireless power receiving device includes the communicating and controlling device 30 for controlling communication of a plurality of components thereof, and monitoring the electrical signals of each component. If the electrical signal is abnormal, the communication and control device 30 can emit a corresponding modulation signal to make each component stable and normal work and feedback the monitoring electrical signals to the transmitting base station to form a loop feedback control, stable transmission of a wireless power transmission system.

Furthermore, the plurality of coils 11 includes a main coil 110 and a sub-coil 111, the malt coil 110 is configured for receiving a main wireless power and the sub-coil 111 is configured for receiving a diffusion power of the marginal of the main coil 110.

Furthermore, the plurality of coils 11 is selected from a coil-winding coder by wire or a printed-coil embedded in a PCB lamination.

Figure 3:
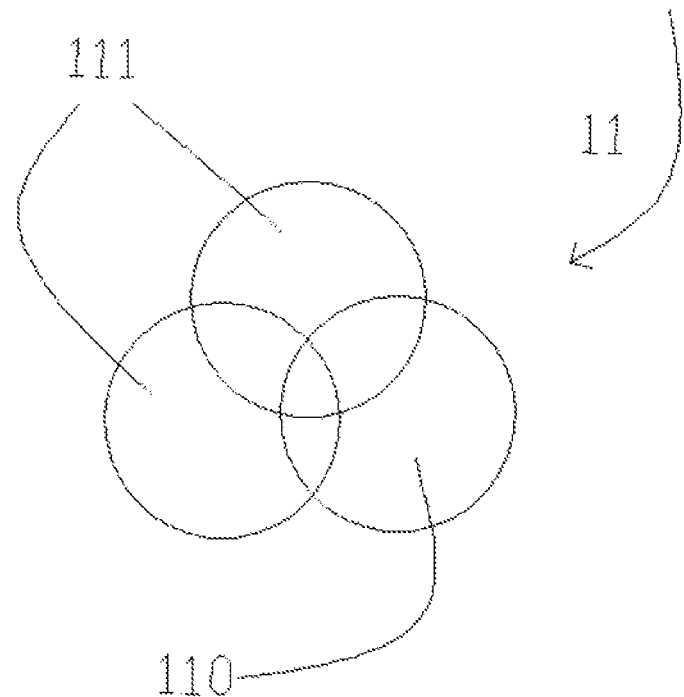
FIG. 3 is an assembly schematic view of a main coil and a sub-coil of a receiving coil of the multicoil multiplex wireless power receiving device of FIG. 2.
Figure 4:
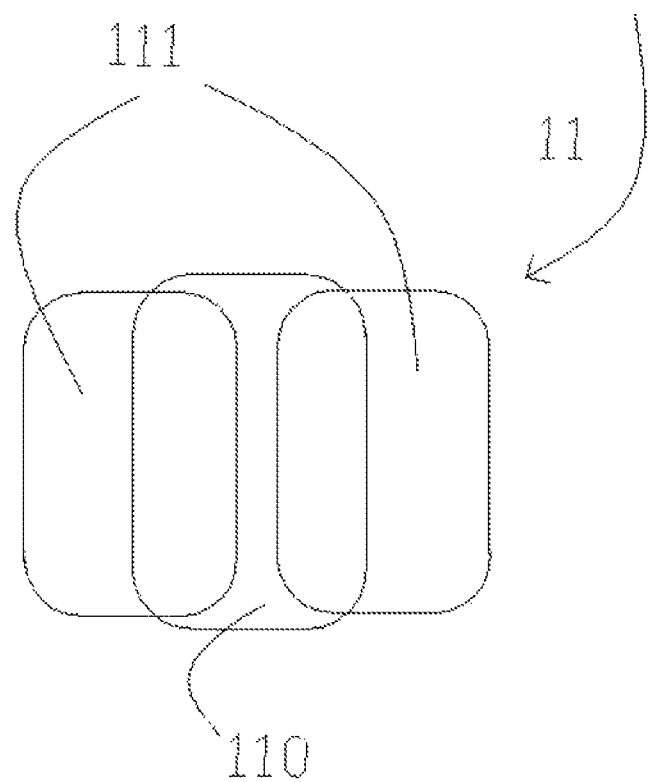
FIG. 4 is another assembly schematic view of a main coil and a sub-coil of a receiving coil of the multicoil multiplex wireless power receiving device of FIG. 2.
Figure 5:
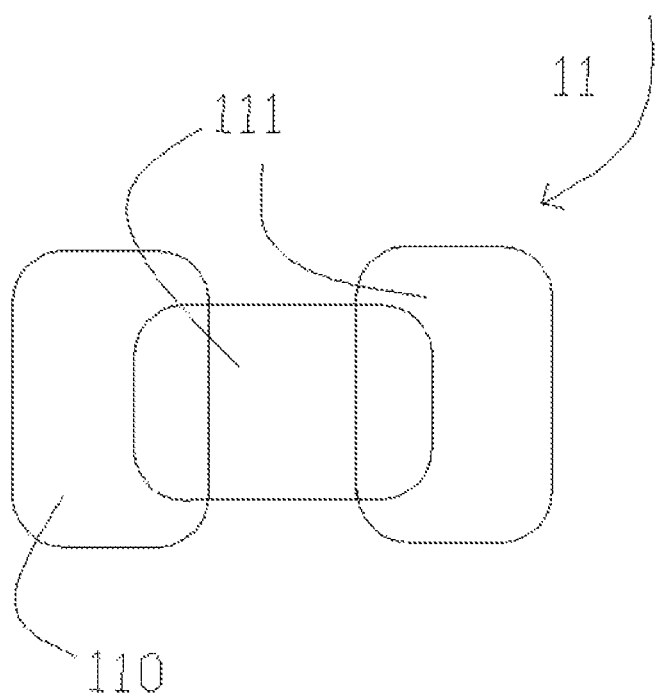
FIG. 5 is a third assembly schematic view of a main coil and a sub-coil of a receiving coil of the multicoil multiplex wireless power receiving device of FIG. 2.
Figure 6:
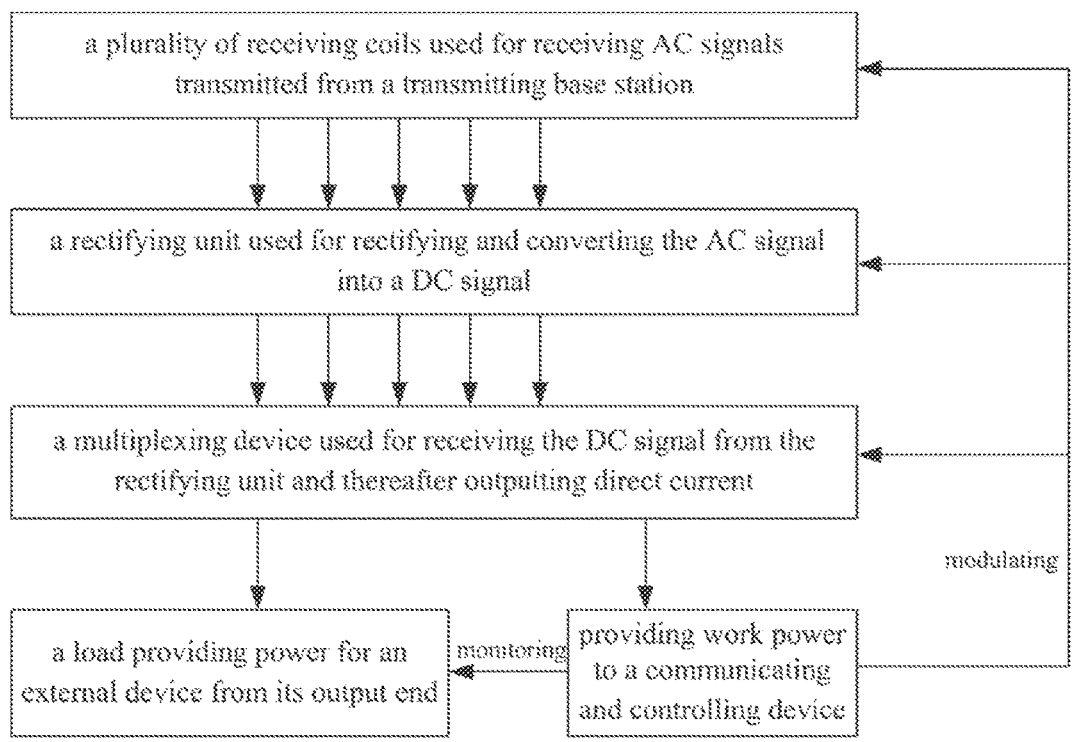
FIG. 6 is a working flow halt of the multicoil multiplex wireless power receiving device of FIG. 2.

Specifically, referring to FIGS. 3-5, a single coil "aligned" with the transmitting coil receives the main wireless power from the transmitting base station as the main coil 110, and the plurality of receiving coils formed around the main coil 110 as the sub-coil 111 captures the diffused power of the marginal of the main coil 110. The coil 11 may be a cod-winding coiled by wire or a printed-coil embedded in a PCB lamination without needing a special coil manufacturing process.

In an exemplary embodiment of the present disclosure, the main coil 110 is configured far receiving a main wireless power from the transmitting base station, and the sub-coil 111 is formed around the main coil 110 and configured for receiving a diffusion power of the marginal of the main coil 110. In this way, it not only improves the overall efficiency of the wireless power transmission, but also improves the thermal stability of the whole transmission loop. In addition, the coil 11 may be a coil-winding coiled by wire or a printed-coil embedded in a PCB lamination, thereby the coil widely used in the market is applicable to the plurality of coils 11 of the present embodiment without needing a special coil manufacturing process, and low manufacturing cost.

Furthermore, the output end of the load 40 includes a sensor 41 configured for monitoring the voltage, the current and the temperature of the output end of the load 40.

Furthermore, the multicoil multiplex wireless power receiving device further includes a signal transmission line 50 connected between the output end of the load 40 and the communicating and controlling device 30. The signal transmission line 50 is configured for transmitting the monitored signal of the sensor 41 to the communicating and controlling device 30.

In an exemplary embodiment of the present disclosure, the output end of the load 40 includes the sensor 41 configured for monitoring the voltage, the current and the temperature of the output end of the load 40, which can ensure that the load outputted from the output end of the load 40 is stable by monitoring these three parameters and the monitored signal transmitted to the communicating and controlling device 30 via the signal transmission line 50. Once the monitored signal exceeds a normal range, the communicating and controlling device 30 starts the feedback modulation so that the multicoil multiplex wireless power receiving device can normally work.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A wireless power receiving method comprising:
a receiving coil configured for receiving AC signals from a transmitting base station;
a rectifying unit configured for rectifying and converting the AC signal into a DC signal;
a multiplexing device configured for receiving the DC signal from the rectifying unit and thereafter outputting direct current;
a communicating and controlling device configured for modulating the multiplexing device and the receiving coil to feedback the DC electrical signal to the transmitting base station, and monitoring an output end of a load; and wherein the communicating and controlling device adjusts the feedbacks when the DC electrical signal of the output end of the load is abnormal.

2. The wireless power receiving method as claimed in claim 1, wherein the receiving coil comprises a main coil and a sub-coil, the main coil is configured for receiving a main wireless power and the sub-coil is configured for receiving a diffusion power of the marginal of the main coil.

3. The wireless power receiving method as claimed in claim 2, wherein the receiving coil is selected from a coil-winding coiled by wire or a printed-coil embedded in a PCB lamination.

4. The wireless power receiving method as claimed in claim 1, wherein the output end of the load comprises a sensor configured for monitoring the voltage, the current and the temperature of the output end of the load.

5. The wireless power receiving method as claimed in claim 4, wherein the multicoil multiplex wireless power receiving device further comprises a signal transmission line connected between the output end of the load and the communicating and controlling device, the signal transmission line is configured for transmitting the monitoring signal of the sensor to the communicating and controlling device.

6. A multicoil multiplex wireless power receiving device used in the wireless power receiving method as claimed in claim 1 comprising:
a receiving and rectifying device comprising a plurality of coils and a plurality of rectifying units electrically connected to the plurality of coils, the plurality of coils configured for receiving AC signals from a transmitting base station; the plurality of rectifying units configured for receiving the AC signals from the plurality of coils and then rectifying and converting the AC signal into a DC signal;
a multiplexing device configured for receiving the DC signal processed by the rectifying unit and thereafter outputting direct current into an output end of a load, and further configured for supplying power to a communicating and controlling device; wherein
the communicating and controlling device is communicated with the multiplexing device to process the signal from the multiplexing device and configured for sending a regulatory signal to the multiplexing device; and
the output end of the load is configured for receiving the direct current processed by the multiplexing device and outputting the direct current to an external device for supplying power.

7. The multicoil multiplex wireless power receiving device as claimed in claim 6, wherein the multiplex wireless power receiving device further comprises a communicating terminal connected between the receiving and rectifying device and the multiplexing device, the multiplexing device is configured for modulating the plurality of coils via the communicating terminal.

8. The multicoil multiplex wireless power receiving device as claimed in claim 6, wherein the plurality of coils can be arranged in accordance with the user's needs The multicoil multiplex wireless power receiving device as claimed in claim 6, wherein the plurality of coils can be arranged in accordance with the user's needs.

9. The multicoil multiplex wireless power receiving device as claimed in claim 8, wherein the plurality of coils comprises a main coil and a sub-coil, the main coil is configured for receiving a main wireless power and the sub-coil is configured for receiving a diffusion power of the marginal of the main coil.

10. The multicoil multiplex wireless power receiving device as claimed in claim 9, wherein the plurality of coils is selected from a coil-winding coiled by wire or a printed-coil embedded in a PCB lamination.

11. The multicoil multiplex wireless power receiving device as claimed in claim 6, wherein the output end of the load comprises a sensor configured for monitoring the voltage, the current and the temperature of the output end of the load.

12. The multicoil multiplex wireless power receiving device as claimed in claim 11, wherein the multicoil multiplex wireless power receiving device further comprises a signal transmission line connected between the output end of the load and the communicating and controlling device, the signal transmission line is configured for transmitting the monitoring signal of the sensor to the communicating and controlling device.

13. A multicoil multiplex wireless power receiving device for receiving signal transmission from a transmitting base station comprising:

a plurality of receiving and rectifying devices, a multiplexing device, a communicating and controlling device and an output end of a load, the plurality of receiving and rectifying devices configured for supplying power to the multiplexing device and communicating with the communicating and controlling device, the multiplexing device configured for supplying power to both the communicating and controlling device and the output end of the load, and also communicating with the communicating and controlling device;

the plurality of receiving and rectifying devices comprising a plurality of coils and a plurality of rectifying units electrically connected to the plurality of coils; the plurality of coils configured for receiving AC signals from the transmitting base station and the plurality of rectifying units configured for receiving the AC signals from the plurality of coils and then rectifying and converting the AC signal into a DC signal;

the multiplexing device configured for receiving the DC signal processed by the plurality of rectifying units and thereafter outputting direct current into the output end of the load;

the communicating and controlling device configured for modulating the multiplexing device and the plurality of coils to feedback the electrical signal to the transmitting base station, and simultaneously monitoring the output end of the load; and wherein the communicating and controlling device adjusts the feedbacks when the electrical signal of the output end of the load is abnormal.

14. The multicoil multiplex wireless power receiving device as claimed in claim 13, wherein the multiplex wireless power receiving device further comprises a communicating terminal connected between the receiving and rectifying device and the multiplexing device, the multiplexing device is configured for modulating the plurality of coils via the communicating terminal.

15. The multicoil multiplex wireless power receiving device as claimed in claim 13, wherein the plurality of coils can be arranged in accordance with the user's needs.

16. The multicoil multiplex wireless power receiving device as claimed in claim 15, wherein the plurality of coils comprises a main coil and a sub-coil, the main coil is configured for receiving a main wireless power and the sub-coil is configured for receiving a diffusion power of the marginal of the main coil.

17. The multicoil multiplex wireless power receiving device as claimed in claim 16, wherein the plurality of coils is selected from a coil-winding coiled by wire or a printed-coil embedded in a PCB lamination.

18. The multicoil multiplex wireless power receiving device as claimed in claim 13, wherein the output end of the load comprises a sensor configured for monitoring the voltage, the current and the temperature of the output end of the load.

19. The multicoil multiplex wireless power receiving device as claimed in claim 18, wherein the multicoil multiplex wireless power receiving device further comprises a signal transmission line connected between the output end of the load and the communicating and controlling device, the signal transmission line is configured for transmitting the monitoring signal of the sensor to the communicating and controlling device.

* * * * *